(No Model.)
J. PRESTON.
BINDER TRUCK.
No. 270,841. Patented Jan. 16, 1883.
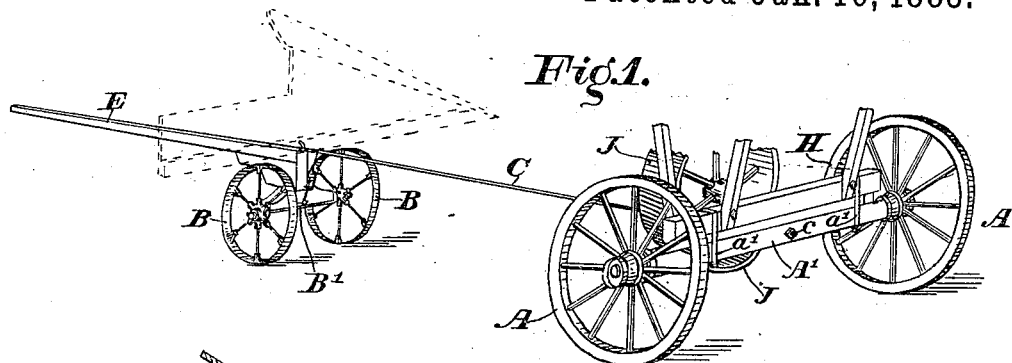
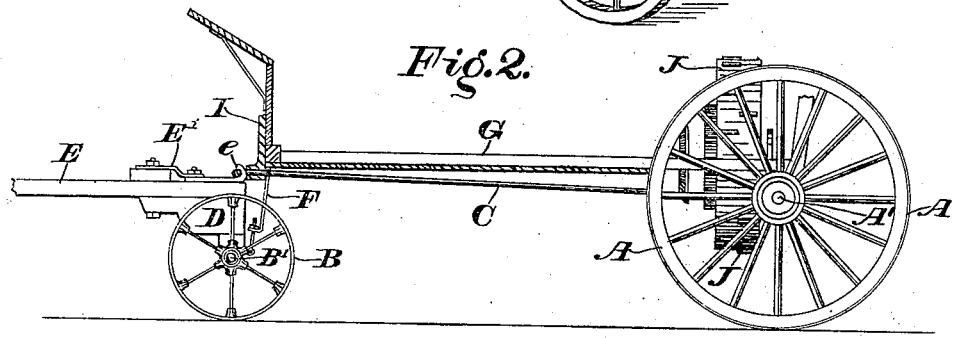
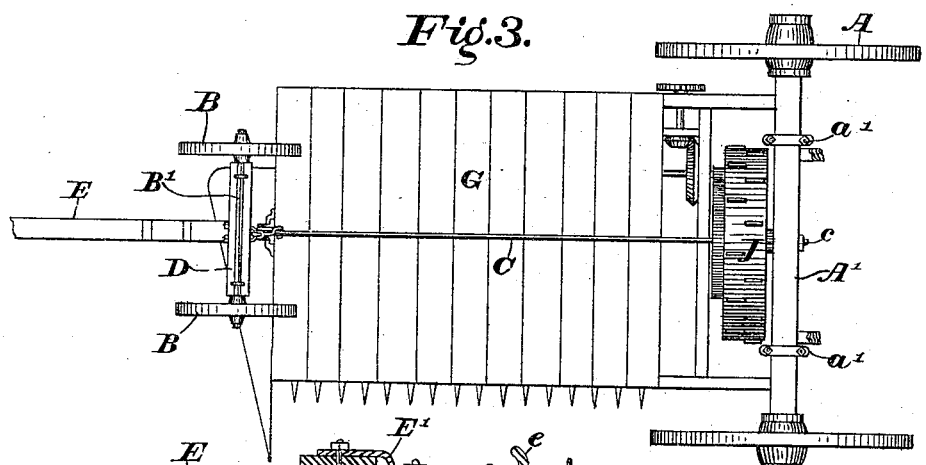
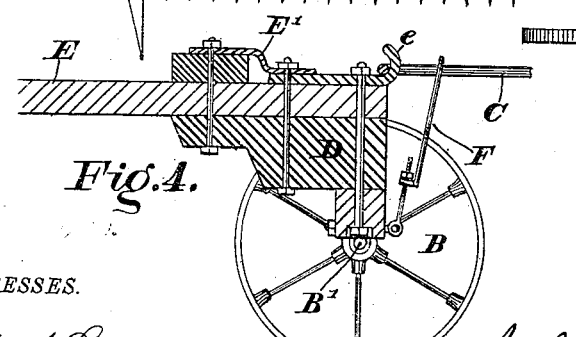
WITNESSES.
Chas. N. Leonard.
E. W. Bradford.
INVENTOR.
John Preston,
PER
C. Bradford
ATTORNEY.

UNITED STATES PATENT OFFICE.

JOHN PRESTON, OF INDIANAPOLIS, INDIANA.

BINDER-TRUCK.

SPECIFICATION forming part of Letters Patent No. 270,841, dated January 16, 1883.

Application filed September 18, 1882. (No model.)

*To all whom it may concern:*

Be it known that I, JOHN PRESTON, of the city of Indianapolis, county of Marion, and State of Indiana, have invented certain new and useful Improvements in Binder-Trucks, of which the following is a specification.

The object of my invention is to produce a truck on which grain-binders can be conveniently, easily, and quickly loaded for transportation from place to place, which, as the users of such machines are aware, has heretofore been attended with considerable difficulty. Said object is accomplished by constructing a truck having four wheels, the two hind wheels being of good size and connected by a simple axle as long as the width of a binder, and the two front wheels being small and near together, and connected by an axle having a bolster built up thereon to a height a little more than equal to that of the top of the wheels, the front and rear portions being connected by a removable rod, and each provided with fastening devices for securing the binder thereto, all as will be hereinafter more particularly set forth.

Referring to the accompanying drawings, which are made a part hereof, and on which similar letters of reference indicate similar parts, Figure 1 is a perspective view of a truck embodying my invention, some parts of a binder being shown as mounted thereon to illustrate its use; Fig. 2, a side elevation of said truck with portions of the binder-frame, some parts being shown in section; Fig. 3, an under side plan of the truck and the binder when mounted thereon, and Fig. 4 a central vertical section of the front end of the truck.

In said drawings, the portions marked A represent the hind wheels of the truck; B, the front wheels; C, the rod which connects the front and rear portions; D, the bolster at the front end; E, the pole or tongue; F, a stay for preventing the front portion from tipping too far; G, the platform; H, the side sill; I, the grain-wheel support, and J the main wheel of a binder.

It has not been deemed necessary to show the remainder of the binder mechanism, as the particular form of the binder is no part of my invention.

The wheels A may be (and preferably are) ordinary wagon-wheels, and are mounted upon the ends of an axle-tree of sufficient length to receive the sill H of the binder. Clevises $a'$ are used to secure said sill to said axle-tree.

The wheels B should be smaller than the wheels A, and are mounted on the axle $B'$, which (as its only purposes are the ordinary ones of an axle) may be (and preferably is) considerably shorter than the axle $A'$.

The rod C extends from the front to the rear of the device, and serves both to connect the two portions together and as a draft-rod, and may also serve as a fastening device to secure the binder upon the truck. It preferably passes through the rear axle, as shown, and is there secured by a nut, $c$, and engages with a hook, $e$, at the front end. It may be divided into two branches, said branches passing through the rear axle near each end instead of a single rod in the center, as shown.

The bolster D may be formed in any suitable manner to fill the space between the axle $B'$ and the tongue E, and supports said tongue so that its top side shall be as high as or higher than the tops of the wheels B.

The pole E is an ordinary pole. It has the usual hammer-strap, $E'$, for securing the doubletree thereon, and the hook $e$, over which the eye on the forward end of the rod C is hooked.

The stay F is for the purpose of preventing the pole E from tipping back too far. It is fastened to the axle or the bolster just above the axle, at its lower end, and the upper end is looped and passed over the rod C. An adjusting-nut and eye similar to a turn-buckle is inserted therein, so that the length thereof may be adjusted to just permit the necessary play of the tongue. When this stay is in place the tongue can only be raised to the determined limit, as, if it is attempted to raise it farther, the stay brings up tightly against the rod C and thus effectually prevents it therefrom.

The manner of using my improved truck is as follows: The binder is raised as high on its wheel J as possible, (all binders being adjustable on said wheel,) one of the wheels A is removed from the axle $A'$, and said axle is placed under the sill H and fastened thereto by means of the clevises or clips $a'$ $a'$. The small grain-wheel is then removed from the outside of the binder, and the rod C passed through its support I back under the platform G and through the axle A', where it is secured by the nut c. Its forward end is formed into an eye or loop, which is placed over the hook e. In putting this rod in position it is also passed through the eye or loop into which the upper end of the stay F is formed, the support I being between said stay and the hook e when all is in position. The tongue of the binder being removed, and the wheel A which was removed replaced on the axle, the loading of the binder is completed, and it may be drawn anywhere desired. As will be noticed, the course of the truck is at right angles with that of the binder when running on its own wheels.

Having thus fully described my said invention, what I claim as new, and desire to secure by Letters Patent, is—

1. In a binder-truck, the combination of the wheels A and B, their respective axles, the bolster D, the tongue E, having hook e, the connecting-rod C, connected at the forward end to said hook, and means for connecting the binder to the truck, substantially as set forth.

2. The combination, in a binder-truck, of the high wheels A, the low wheels B, their respective axles, the bolster D, the tongue E, the connecting-rod C, having a pivoted or jointed connection with the forward portion of the truck, and means, substantially as described, for securing the binder to the truck, substantially as set forth.

3. The combination, in a binder-truck, with the front and rear portions and the rod connecting the same together, of the stay F, whereby the front part is prevented from tipping back too far, substantially as shown and specified.

4. The combination, with the front truck portion, B B' D E, and the rod C, of the adjustable stay F, substantially as described, and for the purposes specified.

5. The combination, in a truck for transporting a binder from place to place, of a hind portion provided with clevises a' a', whereby the sill H of the binder is secured thereto, a front portion to which the wheel-support I is secured by passing the rod C through the same, and said rod, substantially as described, and for the purposes specified.

In testimony whereof I have hereunto set my hand and seal, at Indianapolis, Indiana, this 14th day of September, A. D. 1882.

JOHN PRESTON. [L. S.]

In presence of—
C. BRADFORD,
EWALD OUER.